(12) United States Patent
Heidrich et al.

(10) Patent No.: US 11,731,596 B2
(45) Date of Patent: Aug. 22, 2023

(54) METHOD FOR THE TRACTION CONTROL OF A SINGLE-TRACK MOTOR VEHICLE TAKING THE SLIP ANGLE OF THE REAR WHEEL INTO CONSIDERATION

(71) Applicant: Bayerische Motoren Werke Aktiengesellschaft, Munich (DE)

(72) Inventors: Martin Heidrich, Laufen-Leobendorf (DE); Josef Rank, Suenzhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 121 days.

(21) Appl. No.: 17/417,940

(22) PCT Filed: Dec. 2, 2019

(86) PCT No.: PCT/EP2019/083275
§ 371 (c)(1),
(2) Date: Jun. 24, 2021

(87) PCT Pub. No.: WO2020/151860
PCT Pub. Date: Jul. 30, 2020

(65) Prior Publication Data
US 2022/0073041 A1 Mar. 10, 2022

(30) Foreign Application Priority Data

Jan. 21, 2019 (DE) .................... 10 2019 101 392.5

(51) Int. Cl.
*B60T 8/17* (2006.01)
*B60T 8/1755* (2006.01)
(Continued)

(52) U.S. Cl.
CPC ........ *B60T 8/1706* (2013.01); *B60T 8/17552* (2013.01); *B60W 30/045* (2013.01);
(Continued)

(58) Field of Classification Search
CPC ............. B60W 40/103; B60W 40/072; B60W 40/101; B60W 50/00; B60W 2556/50; B60W 2552/40
See application file for complete search history.

(56) References Cited

U.S. PATENT DOCUMENTS 6,128,569 A * 10/2000 Fukushima ......... B60T 8/17551
701/72
6,405,113 B1 6/2002 Yamawaki et al.
(Continued)

FOREIGN PATENT DOCUMENTS

DE 100 59 689 A1 6/2001
DE 10 2006 061 483 A1 8/2007
(Continued)

OTHER PUBLICATIONS

International Search Report (PCT/ISA/210) issued in PCT Application No. PCT/EP2019/083275 dated Feb. 26, 2020 with English translation (five (5) pages).
(Continued)

*Primary Examiner* — Peter D Nolan
*Assistant Examiner* — Mikko Okechukwu Obioha
(74) *Attorney, Agent, or Firm* — Crowell & Moring LLP

(57) ABSTRACT

A method for determining a slip angle $\lambda_r$ of a rear wheel of a single-track motor vehicle for the purpose of traction control of the rear wheel of the single-track motor vehicle by means of a closed loop control is provided. The slip angle $\lambda_r$ of the rear wheel is determined as a feedback value of the closed loop using at least one of three model-based steps. A slip angle $\lambda_{r1}$, $\lambda_{r2}$ or $\lambda_{r3}$ is determined by one of the three steps representing the slip angle $\lambda_r$ or the slip angle $\lambda_r$ is determined from at least two of the slip angles $\lambda_{r1}$, $\lambda_{r2}$ and $\lambda_{r3}$.

15 Claims, 1 Drawing Sheet

(51) Int. Cl.
*B60W 30/045* (2012.01)
*B60W 30/18* (2012.01)
*B60W 40/072* (2012.01)
*B60W 40/101* (2012.01)
*B60W 50/00* (2006.01)

(52) U.S. Cl.
CPC .... *B60W 30/18172* (2013.01); *B60W 40/072* (2013.01); *B60W 40/101* (2013.01); *B60W 50/00* (2013.01); *B60T 2210/24* (2013.01); *B60T 2210/36* (2013.01); *B60W 2520/105* (2013.01); *B60W 2520/125* (2013.01); *B60W 2520/14* (2013.01); *B60W 2520/16* (2013.01); *B60W 2520/18* (2013.01); *B60W 2530/10* (2013.01); *B60W 2540/18* (2013.01); *B60W 2552/30* (2020.02); *B60W 2552/40* (2020.02); *B60W 2556/35* (2020.02); *B60W 2556/50* (2020.02)

(56) References Cited

U.S. PATENT DOCUMENTS

| | | | | |
|---|---|---|---|---|
| 2008/0001478 | A1* | 1/2008 | Wagner | B60T 8/1706 303/191 |
| 2008/0033612 | A1* | 2/2008 | Raab | B60W 40/103 701/38 |
| 2009/0222164 | A1* | 9/2009 | Seiniger | B60T 8/1706 702/141 |
| 2013/0090828 | A1 | 4/2013 | Lemejda | |
| 2013/0144476 | A1* | 6/2013 | Pinto | B60T 8/17555 903/930 |
| 2013/0261925 | A1* | 10/2013 | Kobayashi | B60K 28/16 701/84 |
| 2015/0274175 | A1* | 10/2015 | Okoshi | G01P 21/00 702/151 |
| 2019/0054924 | A1* | 2/2019 | Ambruzs | B60T 8/3225 |
| 2019/0263421 | A1 | 8/2019 | Zdych | |
| 2019/0283722 | A1* | 9/2019 | Haas | B60T 8/17552 |
| 2022/0355884 | A1* | 11/2022 | Inkirev | B62D 6/00 |

FOREIGN PATENT DOCUMENTS

| | | |
|---|---|---|
| DE | 10 2010 003 951 A1 | 10/2011 |
| DE | 10 2012 219 935 A1 | 4/2014 |
| DE | 10 2013 224 305 A1 | 5/2015 |
| DE | 10 2016 214 064 A1 | 2/2018 |
| DE | 10 2016 223 070 A1 | 5/2018 |
| WO | WO 2009/109240 A1 | 9/2009 |

OTHER PUBLICATIONS

German-language Written Opinion (PCT/ISA/237) issued in PCT Application No. PCT/EP2019/083275 dated Feb. 26, 2020 (six (6) pages).

German-language Search Report issued in German Application No. 10 2019 101 392.5 dated Nov. 18, 2019 with an English translation (14 pages).

* cited by examiner

METHOD FOR THE TRACTION CONTROL OF A SINGLE-TRACK MOTOR VEHICLE TAKING THE SLIP ANGLE OF THE REAR WHEEL INTO CONSIDERATION

BACKGROUND AND SUMMARY OF THE INVENTION

The invention relates to a method for the traction control of a single-track motor vehicle.

Various methods for the traction control of both two-track motor vehicles, such as passenger vehicles, and also for single-track motor vehicles, such as motorcycles, are known in the prior art. The traction control is also called a traction control system (TCS) or also automatic slip regulation (ASR), wherein the various systems popular in the market for traction control have supplier-specific names.

In particular in the case of sudden acceleration processes or in the case of an underlying surface having low adhesive friction, for example as in the case of ice, snow, loose gravel, or wet conditions, the traction control prevents a drive wheel and thus in the case of motorcycles the rear wheel from spinning and the vehicle from breaking away laterally.

For this purpose, the drive torque on the rear wheel is deliberately influenced by the traction control by engaging in the engine management and thus the drive force of the engine is influenced.

The methods known in the prior art for traction control are usually based in motor vehicles solely on the wheel slip, i.e., the ratio of the speed of a driven wheel to the speed of a (hypothetical) nondriven wheel, which therefore rotates in a formfitting manner. In the case of single-track motor vehicles, a vehicle inclination is moreover often taken into consideration, due to which the tire properties or wheel properties of the motor vehicle can change and the determination of the wheel slip is influenced.

In addition, however, in single-track motor vehicles, the slip angle of the rear wheel is also relevant for the wheel slip and for a traction control on the drive wheel or rear wheel, but it is usually only acquirable by a complex and costly sensor system and is therefore not or is only rarely taken into consideration in the traction control. The slip angle of a wheel is understood as the angle between the velocity vector of the wheel in the wheel contact point on the roadway and the intersection line between wheel center plane and roadway plane.

The slip angle is not used for the traction control of a single-track motor vehicle in the majority of the known methods. In addition, in some methods in which the slip angle is taken into consideration, only the yaw angle of the motor vehicle is used for the indication of the location in space for a determination of the slip angle, so that a slip angle determined therefrom can be incorrect, since a motorcycle or a single-track motor vehicle has further degrees of freedom relevant for the traction control and for the slip angle, in particular pitch and roll angles. An incorrect slip angle can propagate in the traction control and cause incorrect or unpredictable behavior of the vehicle.

The invention is therefore based on the object of overcoming the above-mentioned disadvantages and providing a method for the traction control taking the slip angle of the rear wheel into consideration, wherein the slip angle is to be ascertainable easily and cost-effectively.

This object is achieved by the combination of features according to claim 1.

According to the invention, a method is proposed for determining a slip angle $\lambda_r$ of a rear wheel of a single-track motor vehicle for the traction control of the rear wheel of the single-track motor vehicle. The traction control is carried out by a control loop, wherein the slip angle $\lambda_r$ of the rear wheel is a feedback variable of the control loop. For the determination of the slip angle $\lambda_r$, it is provided that it is determined by at least one of the following steps:

Determining a first slip angle $\lambda_{r1}$ using a first state estimator, wherein input variables of the first state estimator are at least one steering angle $\delta$ on the front wheel of the motor vehicle and an orientation of the motor vehicle in space.

Determining a second slip angle $\lambda_{r2}$ using a second state estimator, wherein input variables of the second state estimator are at least one steering angle $\delta$ on the front wheel of the motor vehicle and a movement vector of the motor vehicle in a mass center of gravity of the motor vehicle.

Determining a third slip angle $\lambda_{r3}$, wherein the third slip angle $\lambda_{r3}$ is determined from a relationship known for a single-track model between the steering angle $\delta$, an Ackermann angle $\Delta_A$, a slip angle $\lambda_f$ of a front wheel, and the third slip angle $\lambda_{r3}$ and wherein the slip angle $\lambda_f$ is determined from a previously known ratio of the slip angle $\lambda_f$ to a vehicle status.

In addition, the method according to the invention provides that the first slip angle $\lambda_{r1}$, the second slip angle $\lambda_{r2}$, or the third slip angle $\lambda_{r3}$ represents the slip angle $\lambda_r$. Alternatively thereto, the method provides that the slip angle $\lambda_r$ is determined from at least two of the slip angles $\lambda_{r1}$, $\lambda_{r2}$, and $\lambda_{r3}$.

The basic concept is to determine the slip angle first in a model-based manner or by way of a state estimator in which a model of the vehicle is stored instead of directly measuring the slip angle.

However, if there is an excessive inaccuracy or tolerance of the slip angles $\lambda_{r1}$, $\lambda_{r2}$, $\lambda_{r3}$ determined in a model-based manner or if a high accuracy of the slip angle $\lambda_r$ is required for the traction control to be implemented, it is thus provided that two of the slip angles $\lambda_{r1}$, $\lambda_{r2}$, $\lambda_{r3}$ or all slip angles $\lambda_{r1}$, $\lambda_{r2}$, $\lambda_{r3}$ are used to determine the slip angle $\lambda_r$.

If the accuracy or the correctness of the individual slip angles $\lambda_{r1}$, $\lambda_{r2}$, $\lambda_{r3}$ is inadequate or doubtful, the concept according to the invention for determining the slip angle $\lambda_r$ is therefore preferably to first determine the slip angle $\lambda_r$ in at least two model-based and in particular three different ways, which are each implementable cost-effectively, however, and in particular by way of state estimators, in each of which a model of the vehicle is stored, whereby the slip angles $\lambda_{r1}$, $\lambda_{r2}$, $\lambda_{r3}$ result, which each represent the slip angle $\lambda_r$ as such, but can deviate from an actual slip angle at the rear wheel. To reduce the deviation, for error recognition, and to increase the accuracy, it is subsequently provided that a slip angle $\lambda_r$ for the control of the drive torque on the rear wheel or for the traction control is to be calculated from the "estimated" or model-based slip angles $\lambda_{r1}$, $\lambda_{r2}$, $\lambda_{r3}$. The slip angle $\lambda_r$ determined from at least two of the slip angles $\lambda_{r1}$, $\lambda_{r2}$, $\lambda_{r3}$ corresponds to the actual slip angle existing on the rear wheel more accurately than the individual slip angles $\lambda_{r1}$, $\lambda_{r2}$, $\lambda_{r3}$.

In particular in control technology, so-called state estimators, which are also referred to as state observers, are known, by way of which it is possible to approximately determine variables which cannot be directly observed or measured.

The steering angle $\delta$ is preferably acquired by a steering angle sensor on the front wheel of the single-track motor vehicle.

One advantageous refinement of the method provides that the first state estimator is a Kalman filter or alternatively an expanded Kalman filter.

In addition, it is advantageous if the second state estimator is a Kalman filter or an expanded Kalman filter, wherein variables of nonlinear systems can be observed or estimated by the expanded Kalman filter.

The orientation of the motor vehicle in space as an input variable of the first state estimator is determined in a likewise advantageous embodiment by a roll angle $\Phi$, a yaw angle $\Psi$, and a pitch angle $\Theta$ of the motor vehicle.

In this case, the yaw angle $\Psi$ describes the orientation of the vehicle around the z axis or the vertical axis of the vehicle. The roll angle $\Phi$ describes the orientation of the vehicle around the x axis or the longitudinal axis of the vehicle and the pitch angle $\Theta$ describes the orientation around the y axis or the transverse axis orthogonal to the longitudinal axis of the vehicle.

One advantageous variant of the method moreover provides that a curve radius R of a curve described by the motor vehicle is determined and the curve radius R is an input variable of the first state estimator.

It is moreover also advantageous if the curve radius R and the orientation of the motor vehicle are determined from a roll rate $\dot{\phi}$, a yaw rate $\dot{\psi}$, and a pitch rate $\dot{\Theta}$ as well as an acceleration of the motor vehicle in space and a vehicle velocity v. The vehicle velocity v is preferably a representative vehicle velocity, which is ascertained from the wheel velocities in consideration of a contact loss or a lift-off detection. The acceleration of the motor vehicle in space preferably corresponds to the acceleration in the direction of the spatial axes, so that the acceleration of the vehicle in space is composed of the accelerations $a_x$, $a_y$, and $a_z$.

An inertial measurement unit (IMU), which is present in the vehicle and is provided for further control systems in the vehicle in any case, is preferably used for the ascertainment or the measurement of the roll rate $\dot{\phi}$, the yaw rate $\dot{\psi}$, and the pitch rate $\dot{\Theta}$, as well as the accelerations $a_x$, $a_y$, and $a_z$.

For this purpose, an IMU usually has acceleration sensors for acquiring the acceleration in three spatial directions and rotation rate sensors for acquiring the rotational velocity around the three spatial directions.

One refinement of the method, which is also advantageous, moreover provides that a vehicle mass m of the motor vehicle is determined, and a coefficient of friction $\mu$ between a roadway and a tire of the rear wheel is determined. In addition, the vehicle mass m and the coefficient of friction $\mu$ are input variables of the first state estimator.

It is moreover advantageous if the movement vector of the motor vehicle is determined as an input variable of the second state estimator from a change of a vehicle position ascertained using a GPS and/or from a change of an Earth's magnetic field measured using a magnetometer. The movement vector can alternatively be directly measured using the magnetometer.

One refinement moreover provides that a course angle, which refers to the angle between north direction and the movement vector or the movement direction, is determined from the movement vector or directly from the change of the position which was ascertained using the GPS and/or magnetometer. Alternatively to the movement vector or the movement direction, the course angle can also be used directly as an input variable of the second state estimator.

If the movement vector, the movement direction, and/or the course angle is determined both from the change of the vehicle position ascertained using the GPS and also from the change of the Earth's magnetic field measured using the magnetometer, it is preferably provided that the respective ascertained changes are fused by means of a data fusion or a signal fusion, in particular by means of a Kalman filter, in order to obtain a measured value having higher accuracy and improved availability.

One advantageous variant provides that the slip angle $\lambda_r$ is determined from precisely two of the slip angles $\lambda_{r1}$, $\lambda_{r2}$, and $\lambda_{r3}$ by a data fusion. Data fusion in general refers to the linkage of multiple values representing the same variable, wherein the data fusion is usually used to obtain items of information of better quality. A Kalman filter or an expanded Kalman filter can also be used, for example, for the data fusion.

For further error reduction, one refinement provides that a measurement deviation between the slip angle $\lambda_r$ determined by the data fusion is determined as a measured value and the slip angle $\lambda_{r1}$, $\lambda_{r2}$, or $\lambda_{r3}$ not used in the determination of the slip angle $\lambda_r$ is determined as a reference value. Measures for error correction can then be taken based on the measurement deviation.

It is furthermore advantageous if before the data fusion, a deviation between the slip angles $\lambda_{r1}$, $\lambda_{r2}$, and $\lambda_{r3}$ is determined and the slip angle $\lambda_r$ is determined by the data fusion of the two slip angles of the slip angles $\lambda_{r1}$, $\lambda_{r2}$, and $\lambda_{r3}$ having the smallest deviation from one another.

For the determination of the third slip angle $\lambda_{r3}$, it is moreover advantageous if the vehicle status for determining the third slip angle $\lambda_{r3}$ is determined by a vehicle velocity v of the motor vehicle, a curve radius R of a curve described by the motor vehicle, and a roll angle $\Phi$.

Moreover, it is provided in one variant that a tire lateral force $F_{s,f}$ on a tire of the front wheel is determined from the curve radius R and the vehicle velocity v using a third state estimator and the slip angle $\lambda_f$ of the front wheel is predetermined for the roll angle $\Phi$ and the tire lateral force $F_{s,f}$. The tire lateral force $F_{s,f}$ can be determined, for example, by means of a state estimator from the curve radius and the vehicle velocity. The ratio between the slip angle $\lambda_f$ and the roll angle $\Phi$ at the tire lateral force $F_{s,f}$ can be mapped, for example, by a function, a characteristic curve, or a characteristic map and the slip angle $\lambda_f$ can thus be determinable. The third state estimator is also implementable as a Kalman filter or expanded Kalman filter.

A further aspect of the invention relates to a method for the traction control of a rear wheel of a single-track motor vehicle by a control loop. A slip angle $\lambda_r$ of the rear wheel as a feedback variable of the control loop is determined in this case by the method according to the invention.

Furthermore, one aspect of the invention relates to a system for the traction control of a rear wheel of a single-track motor vehicle. The system comprises a control unit, wherein the control unit is designed to determine a slip angle $\lambda_r$ according to the method according to the invention.

The features disclosed above can be combined arbitrarily, if it is technically possible and they are not contradictory to one another.

Other advantageous refinements of the invention are characterized in the dependent claims or are described in greater detail in the following together with the description of the preferred embodiment of the invention on the basis of the figures.

The figures are schematic and by way of example. Identical reference signs in the figures indicate identical functional and/or structural features.

DETAILED DESCRIPTION

Figure 1:
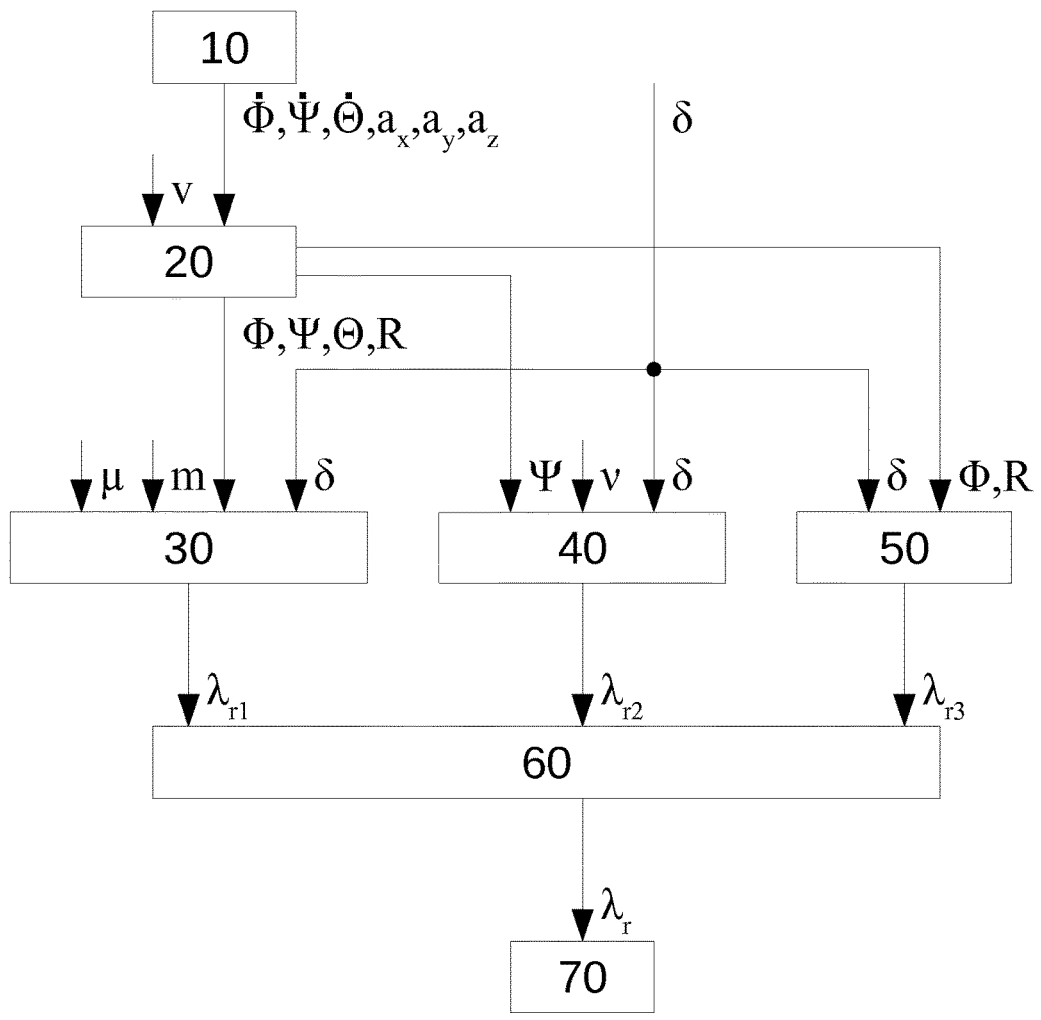
FIG. 1 shows a method for determining the slip angle $\lambda_r$ in accordance with an embodiment of the present invention.

FIG. 1 schematically shows the sequence in the determination of the slip angle $\lambda_r$ using all three slip angles $\lambda_{r1}$, $\lambda_{r2}$, $\lambda_{r3}$.

The roll rate $\dot{\phi}$, yaw rate $\dot{\psi}$, and pitch rate $\dot{\Theta}$, as well as the accelerations $a_x$, $a_y$, and $a_z$ in the three spatial directions x, y, and z are determined by the inertial measurement unit 10 (IMU) and provided to the conversion 20. In the conversion 20, the roll angle $\Phi$, which is also referred to as the slip angle, the yaw angle $\Psi$, and the pitch angle $\Theta$, as well as the curve radius R of the curve described by the motor vehicle are determined from roll rate $\dot{\phi}$, yaw rate $\dot{\psi}$, and pitch rate $\dot{\Theta}$, and from the vehicle velocity v.

The three slip angles $\lambda_{r1}$, $\lambda_{r2}$, and $\lambda_{r3}$ are subsequently determined in three different ways, so that a possible error or a deviation of the respective slip angle $\lambda_{r1}$, $\lambda_{r2}$, and $\lambda_{r3}$ from the actual slip angle at the rear wheel may be compensated for.

The first state estimator 30 is a Kalman filter, in which a linear vehicle model is stored. The first slip angle $\lambda_{r1}$ is determined from a vehicle mass m, a coefficient of friction µ, the variables ascertained by the IMU 10, and the steering angle $\delta$.

Both the vehicle mass m and also the coefficient of friction µ can be "estimated" based on sensor data. For example, the vehicle mass can be composed of individual values added to one another. For this purpose, an empty weight of the vehicle can be known, a fuel weight can be determined by a tank fill level, and, for example, a weight of the persons on the vehicle can be ascertained from a spring behavior acquired by sensors.

The following applies for the determination of the first slip angle $\lambda_{r1}$:

$$\lambda_{r1} = \frac{F_{s,r}}{a_r}$$

$$F_{s,r} = f_1\{\mu, \Phi, F_{N,r}\}$$

$$a_r = f_2\{\mu, \Phi, F_{N,r}\}$$

$$F_{s,f} * \cos\Delta + F_{s,r} + m * Y_G * \Psi^2 = 0$$

The functions f1 and f2 are each stored here in the first state estimator 30.

The second slip angle $\lambda_{r2}$ is determined subsequently or in parallel to the first slip angle $\lambda_{r1}$. For this purpose, a second state estimator 40 implemented as an expanded Kalman filter is used, which uses the yaw angle $\Psi$, the course angle v, and the steering angle $\delta$ as input variables, wherein the observation or the use of a nonlinear model of the vehicle is possible due to the expanded Kalman filter.

The course angle v can be determined from a change of the vehicle position, which can be ascertained by a GPS. Alternatively thereto, it is possible to determine the course angle v by way of a change of the Earth's magnetic field measured using a magnetometer. To obtain an exact course angle v, the embodiment shown provides that a course angle v is used which originates from a data fusion. For this purpose, a first course angle v1 is ascertained with the aid of the GPS and a second course angle v2 is ascertained with the aid of the magnetometer and these two course angles v1, v2 are offset to form a course angle v. One very simple option is, for example, to determine the mean value of the course angles v1, v2 and use it as the course angle v. Alternatively thereto, however, a data fusion can also be carried out by means of a further Kalman filter.

Subsequently or in parallel, a third slip angle $\lambda_{r3}$ is ascertained by the determination 50. For this purpose, the steering angle $\delta$ and the roll angle $\Phi$ determined by the IMU 10 and the radius R are used as essential input variables. The determination 50 of the third slip angle $\lambda_{r3}$ is explained in greater detail by way of example with respect to FIG. 2.

For the determination of all three slip angles $\lambda_{r1}$, $\lambda_{r2}$, and $\lambda_{r3}$, a database acquired at the same time is used in each case, so that, for example, the steering angle $\delta$ is identical in each case.

After the three slip angles $\lambda_{r1}$, $\lambda_{r2}$, and $\lambda_{r3}$ have been determined they are offset with one another by the data fusion 60. The data fusion 60 determines in the embodiment shown the slip angle $\lambda_r$, which corresponds to the actual slip angle at the rear wheel with a higher probability than each of the three slip angles $\lambda_{r1}$, $\lambda_{r2}$, and $\lambda_{r3}$ as such, by means of a further Kalman filter. The slip angle $\lambda_r$ thus determined is subsequently provided to the traction control 70.

Alternatively to the method shown in FIG. 1, for example, only a part of the slip angles $\lambda_{r1}$, $\lambda_{r2}$, and $\lambda_{r3}$ can also be used to determine the slip angle $\lambda_r$.

The models or the state estimators and the calculations and the constants required for this purpose can be stored, for example, in a control unit or in the control unit of the traction control, so that the determination of the slip angle $\lambda_r$ can be carried out using the control unit, wherein the further required sensor values or variables are provided to the control unit, for example, by the IMU 10 and a steering angle sensor.

Figure 2:
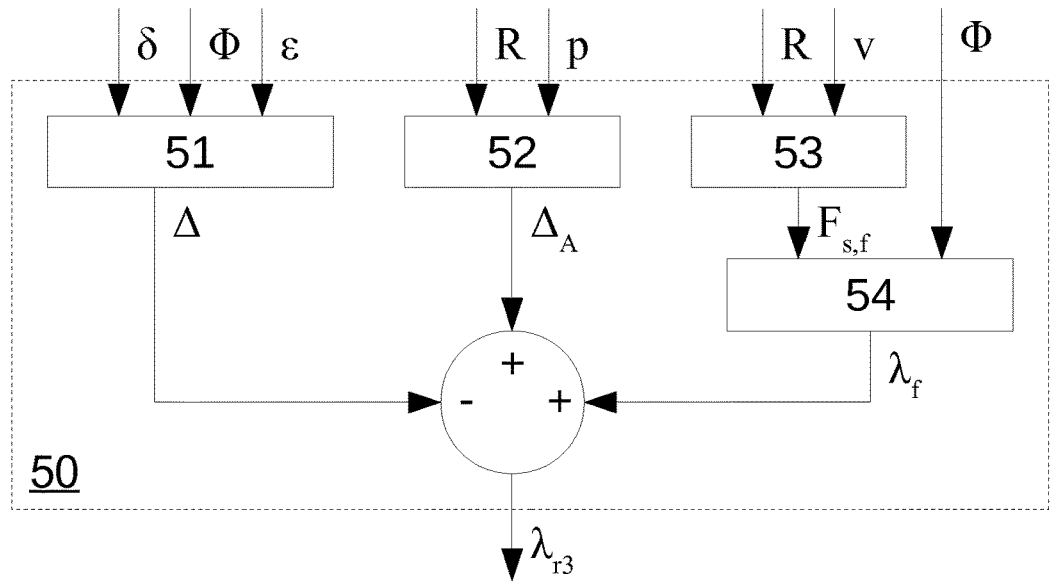
FIG. 2 shows a method for determining the slip angle $\lambda_{r3}$ in accordance with an embodiment of the present invention.

FIG. 2 shows by way of example the sequence for determining the third slip angle $\lambda_{r3}$. In addition to the steering angle $\delta$, the slip or roll angle $\Phi$, and the curve radius R, the velocity v of the vehicle are also used as input values for the determination 50. In addition, the constant castor angle $\varepsilon$ and the wheelbase p are additionally used to determine the third slip angle $\lambda_{r3}$.

In the determination 51 of the kinematic steering angle $\Delta$, i.e., the theoretical steering angle resulting in the actual cornering, the actual steering angle $\delta$ and also the roll angle $\Phi$ and the castor angle $\varepsilon$ are taken into consideration, which jointly result in the kinematic steering angle $\Delta$.

Moreover, the Ackermann angle $\Delta_A$ is determined by the calculation 52, which results according to the single-track model under the assumption of small angles for $\Delta_A = p/R$.

Furthermore, the following applies for the single-track model at small angles:

$$\Delta = \frac{p}{R} + \lambda_f - \lambda_r$$

$$\lambda_r = \Delta_A + \lambda_f - \Delta$$

To determine the front slip angle $\lambda_f$, with the aid of a third state estimator 53, the tire lateral force $F_{s,f}$ on the front tire is determined from a traveled curve radius R and the vehicle velocity v. The ratio of the front tire lateral force $F_{s,f}$ at an inclination described by the roll angle $\Phi$ in relation to the front slip angle $\lambda_f$ is known and is stored, for example, by a characteristic map or a function, so that the front slip angle $\lambda_f$ is determinable therefrom and the rear slip angle $\lambda_r$ is determinable as the third slip angle $\lambda_{r3}$ therefrom.

The invention is not restricted in its embodiment to the above-described preferred exemplary embodiments. Rather, a number of variants is conceivable, which also makes use of the described solution in fundamentally differently designed embodiments.

LIST OF VARIABLES AND REFERENCE NUMERALS

δ steering angle
Δ kinematic steering angle
ε castor angle
p wheelbase
$Y_G$ distance of the vehicle center of gravity to the axis of rotation
v vehicle velocity
R curve radius
$\Delta_A$ Ackermann angle
m mass of the vehicle
ν course angle
μ coefficient of friction between roadway and tire
αr slip stiffness characteristic value of the tire installed on the rear wheel
FN,r tire normal force front
Fs,f tire lateral force front
Fs,r tire lateral force rear
λr slip angle rear
λf slip angle front
Φ roll angle (inclination angle)
Ψ yaw angle
Θ pitch angle
$\dot{\phi}$ roll rate (roll velocity)
$\dot{\psi}$ yaw rate (yaw velocity)
$\dot{\Theta}$ pitch rate (pitch velocity)
ax acceleration in x direction
ay acceleration in y direction
az acceleration in z direction
10 inertial measurement unit (IMU)
20 conversion
30 first state estimator
40 second state estimator
50 determination of the third slip angle λr3
51 determination of the kinematic steering angle Δ
52 determination of the Ackermann angle ΔA
53 third state estimator
54 determination of the front slip angle λf
60 data fusion
70 traction control

What is claimed is:

1. A method for determining a slip angle $\lambda_r$ of a rear wheel of a single-track motor vehicle for the traction control of the rear wheel of the single-track motor vehicle by a control loop, comprising the acts of:
    determining the slip angle $\lambda_r$ of the rear wheel as a feedback variable of the control loop by at least one of
    determining a first slip angle $\lambda_{r1}$ using a first state estimator, wherein input variables of the first state estimator are at least one steering angle δ on a front wheel of the single-track motor vehicle and an orientation of the single-track motor vehicle in space,
    determining a second slip angle $\lambda_{r2}$ using a second state estimator, wherein input variables of the second state estimator are at least one steering angle δ on the front wheel of the single-track motor vehicle and a movement vector of the single-track motor vehicle in a mass center of gravity of the single-track motor vehicle, and
    determining a third slip angle $\lambda_{r3}$, wherein the third slip angle $\lambda_{r3}$ is determined from a predetermined relationship for a single-track model between the steering angle δ, an Ackermann angle ΔA, a slip angle $\lambda_f$ of a front wheel, and the third slip angle $\lambda_{r3}$
    wherein
    the slip angle $\lambda_f$ is determined from a predetermined ratio of the slip angle $\lambda_f$ to a vehicle status, and
    the first slip angle $\lambda_{r1}$, the second slip angle $\lambda_{r2}$, or the third slip angle $\lambda_{r3}$ represents the slip angle $\lambda_r$, or the slip angle $\lambda_r$ is determined from at least two of the slip angles $\lambda_{r1}$, $\lambda_{r2}$, and $\lambda_{r3}$.

2. The method according to claim 1, wherein
the first state estimator is a Kalman filter or an expanded Kalman filter.

3. The method according to claim 2, wherein
the second state estimator is a Kalman filter or an expanded Kalman filter.

4. The method according to claim 3, further comprising the act of:
    determining the orientation of the motor vehicle in space from a roll angle Φ, a yaw angle Ψ, and a pitch angle Θ of the motor vehicle.

5. The method according to claim 4, further comprising the act of:
    determining a curve radius R of a curve described by the single-track motor vehicle, and
    the curve radius R is an input variable of the first state estimator.

6. The method according to claim 5, wherein
the curve radius R and the orientation of the motor vehicle are determined from a roll rate $\dot{\phi}$, a yaw rate $\dot{\psi}$, and a pitch rate $\dot{\Theta}$ as well as an acceleration of the motor vehicle in space and a vehicle velocity v.

7. The method according to claim 6, further comprising the act of:
    determining a vehicle mass m of the single-track motor vehicle,
    wherein
    a coefficient of friction μ between a roadway and a tire of the rear wheel is determined, and
    the vehicle mass m and the coefficient of friction μ are input variables of the first state estimator.

8. The method according to claim 7, wherein
the movement vector of the motor vehicle is determined as an input variable of the second state estimator from a change of a vehicle position ascertained using at least one of a GPS and from a change of an Earth's magnetic field measured using a magnetometer.

9. The method according to claim 1, further comprising the act of:
    determining the slip angle $\lambda_r$ from precisely two of the slip angles $\lambda_{r1}$, $\lambda_{r2}$, and $\lambda_{r3}$ by data fusion.

10. The method according to claim 9, further comprising the acts of:
    determining as a measured value a measurement deviation between the slip angle $\lambda_r$ determined by the data fusion; and
    determining as a reference value and the slip angle $\lambda_{r1}$, $\lambda_{r2}$, or $\lambda_{r3}$ not used in the determination of the slip angle $\lambda_r$ using the precisely two of the slip angles $\lambda_{r1}$, $\lambda_{r2}$, and $\lambda_{r3}$.

11. The method according to claim 9, further comprising the acts of:

determining a deviation between the slip angles $\lambda_{r1}$, $\lambda_{r2}$, and $\lambda_{r3}$; and determining the slip angle $\lambda_r$ by the data fusion of the two slip angles of the slip angles $\lambda_{r1}$, $\lambda_{r2}$, and $\lambda_{r3}$ having the smallest deviation from one another.

12. The method according to claim 1, further comprising the act of:

determining a vehicle status for determining the third slip angle $\lambda_{r3}$ using a vehicle velocity v of the motor vehicle, a curve radius R of a curve described by the motor vehicle, and a roll angle $\Phi$.

13. The method according to claim 12, further comprising the act of:

determining a tire lateral force $F_{s,f}$ on a tire of the front wheel from the curve radius R and the vehicle velocity v using a third state estimator, wherein the slip angle $\lambda_f$ is predetermined for the roll angle $\Phi$ and the tire lateral force $F_{s,f}$.

14. A method for traction control of a rear wheel of a single-track motor vehicle by a control loop, wherein a slip angle λr of the rear wheel is determined as a feedback variable of the control loop, comprising the acts of: determining the slip angle λr of the rear wheel as a feedback variable of the control loop; and controlling traction of the rear wheel using the determined slip angle λr in the control loop, wherein the act of determining the slip angle λr of the rear wheel as a feedback variable of the control loop is performed by at least one of determining a first slip angle λr1 using a first state estimator, wherein input variables of the first state estimator are at least one steering angle δ on a front wheel of the single-track motor vehicle and an orientation of the single-track motor vehicle in space, determining a second slip angle λr2 using a second state estimator, wherein input variables of the second state estimator are at least one steering angle δ on the front wheel of the single-track motor vehicle and a movement vector of the single-track motor vehicle in a mass center of gravity of the single-track motor vehicle, and determining a third slip angle λr3, wherein the third slip angle λr3 is determined from a predetermined relationship for a single-track model between the steering angle δ, an Ackermann angle λA, a slip angle λf of a front wheel, and the third slip angle λr3 wherein the slip angle λf is determined from a predetermined ratio of the slip angle λf to a vehicle status, and wherein the first slip angle λr1, the second slip angle λr2, or the third slip angle λr3 represents the slip angle λr, or the slip angle λr is determined from at least two of the slip angles λr1, λr2, and λr3.

15. A system for traction control of a rear wheel of a single-track motor vehicle, comprising:

a control unit, the control unit being configured to determine a slip angle $\lambda_r$ as a feedback variable of the control loop by at least one of determining a first slip angle $\lambda_{r1}$ using a first state estimator, wherein input variables of the first state estimator are at least one steering angle δ on a front wheel of the single-track motor vehicle and an orientation of the single-track motor vehicle in space, determining a second slip angle $\lambda_{r2}$ using a second state estimator, wherein input variables of the second state estimator are at least one steering angle δ on the front wheel of the single-track motor vehicle and a movement vector of the single-track motor vehicle in a mass center of gravity of the single-track motor vehicle, and determining a third slip angle $\lambda_{r3}$, wherein the third slip angle $\lambda_{r3}$ is determined from a predetermined relationship for a single-track model between the steering angle δ, an Ackermann angle ΔA, a slip angle $\lambda_f$ of a front wheel, and the third slip angle $\lambda_{r3}$ wherein the slip angle $\lambda_f$ is determined from a predetermined ratio of the slip angle $\lambda_f$ to a vehicle status, and the first slip angle $\lambda_{r1}$, the second slip angle $\lambda_{r2}$, or the third slip angle $\lambda_{r3}$ represents the slip angle $\lambda_r$, or the slip angle $\lambda_r$ is determined from at least two of the slip angles $\lambda_{r1}$, $\lambda_{r2}$, and $\lambda_{r3}$.

* * * * *